(12) United States Patent
Brunsman et al.

(10) Patent No.: US 10,229,249 B1
(45) Date of Patent: **\*Mar. 12, 2019**

(54) DISTRIBUTING CONTENT TO A HAND-HELD DEVICE AFTER SELECTION AND AUTHORIZATION AT A COMPUTER

(71) Applicant: Google LLC, Mountain View, CA (US)

(72) Inventors: Jonathan Brunsman, Mountain View, CA (US); David P. Conway, Los Altos, CA (US); Pierre Delisle, San Jose, CA (US); Ficus Kirkpatrick, Los Altos Hills, CA (US); Paul Montoy-Wilson, Palo Alto, CA (US); Michael Morrissey, Atlanta, GA (US); Christian Sonntag, San Francisco, CA (US); Juliana Tsang, Fremont, CA (US); Mark Womack, San Jose, CA (US); Peisun Wu, Mountain View, CA (US)

(73) Assignee: Google LLC, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/873,231

(22) Filed: Oct. 2, 2015

Related U.S. Application Data (63) Continuation of application No. 14/205,410, filed on Mar. 12, 2014, now Pat. No. 9,178,964, which is a
(Continued)

(51) Int. Cl.
  *G06F 21/35* (2013.01)
  *G06F 21/10* (2013.01)
(Continued)

(52) U.S. Cl.
  CPC ............ *G06F 21/10* (2013.01); *H04L 67/306* (2013.01); *H04L 67/42* (2013.01)

(58) Field of Classification Search
  None
  See application file for complete search history.

(56) References Cited

U.S. PATENT DOCUMENTS

| 7,680,849 | B2 | 3/2010 | Heller et al. |
| 7,708,194 | B2 * | 5/2010 | Vawter .................. G06Q 20/32 235/380 |

(Continued)

FOREIGN PATENT DOCUMENTS

WO    1998/53397 A1    11/1998

OTHER PUBLICATIONS

Jansen, et al., "Assigning and Enforcing Security Policies on Handheld Devices", NIST(2002).
(Continued)

*Primary Examiner* — Venkat Perungavoor
(74) *Attorney, Agent, or Firm* — Shumaker & Sieffert, P.A.

(57) ABSTRACT

A method and apparatus are disclosed for distributing content items to a handheld device using a personal computer. A user can browse and select content using a personal computer or other computer that may be more readily available or more convenient to use than the handheld device. The personal computer can communicate with a web server which receives the user's request for content to be distributed to the handheld device. The web server can retrieve configuration information pertaining to the handheld device and communicate with a content server to determine whether the user's request for content distribution is valid based on information identifying the handheld device and at least some of the configuration information pertaining to the handheld device. The content server can
(Continued)

transmit the requested content item to the handheld device if the user's request is valid and if the handheld device is able to receive the content item.

21 Claims, 4 Drawing Sheets

Related U.S. Application Data continuation of application No. 13/475,195, filed on May 18, 2012, now Pat. No. 8,699,707.

(60) Provisional application No. 61/488,517, filed on May 20, 2011.

(51) Int. Cl.
*H04L 29/06* (2006.01)
*H04L 29/08* (2006.01)
*H04L 9/12* (2006.01)

(56) References Cited

U.S. PATENT DOCUMENTS

| | | | |
|---|---|---|---|
| 7,716,281 B2 | 5/2010 | Lin et al. | |
| 7,751,807 B2 | 7/2010 | Lin et al. | |
| 8,340,635 B2 | 12/2012 | Herz et al. | |
| 8,346,847 B2 | 1/2013 | Steakley | |
| 8,719,090 B2* | 5/2014 | Lewis | G06Q 30/0225 705/14.49 |
| 8,745,153 B2 | 6/2014 | Gharabally et al. | |
| 8,949,376 B2* | 2/2015 | Prestenback | H04N 7/17318 709/219 |
| 9,021,554 B2* | 4/2015 | Cassidy | H04L 63/102 726/3 |
| 9,092,542 B2* | 7/2015 | Bodin | G06F 17/30905 |
| 2004/0054923 A1* | 3/2004 | Seago | H04L 63/102 726/4 |
| 2006/0123053 A1 | 6/2006 | Scannell | |
| 2006/0236092 A1 | 10/2006 | Hamalainen | |
| 2007/0249331 A1* | 10/2007 | Sinivaara | H04L 67/04 455/418 |
| 2009/0058869 A1* | 3/2009 | Gustin | H04L 29/1215 345/581 |
| 2009/0151006 A1 | 6/2009 | Saeki et al. | |
| 2011/0081890 A1* | 4/2011 | Ahmadvand | H04M 15/00 455/411 |
| 2011/0154135 A1 | 6/2011 | Tyhurst et al. | |
| 2011/0176456 A1* | 7/2011 | Tamura | G06F 13/122 370/254 |
| 2011/0211540 A1* | 9/2011 | Leinonen | H04W 48/16 370/329 |
| 2011/0231872 A1* | 9/2011 | Gharachorloo | H04N 21/4126 725/28 |
| 2012/0036552 A1 | 2/2012 | Dare et al. | |
| 2012/0144416 A1* | 6/2012 | Wetzer | H04N 21/25816 725/14 |
| 2012/0167155 A1* | 6/2012 | Mampaey | H04N 7/17318 725/109 |
| 2012/0222129 A1 | 8/2012 | Racciopi et al. | |
| 2012/0240177 A1* | 9/2012 | Rose | H04N 21/252 725/116 |
| 2015/0099507 A1* | 4/2015 | Cassidy | H04L 63/102 455/419 |
| 2015/0100476 A1* | 4/2015 | Agapitov | G06Q 20/123 705/39 |

OTHER PUBLICATIONS

"Apple's free iCioud will automatically sync data from Macs, PCs, iOS devices," appleinsider.com, Jun. 6, 2011, 6 pp.

"How to sync apps via iCioud [iOS 5]," Karthikk.com, Jun. 12, 2011, 8 pp.

"BYOD Requires Mobile Device Management," TECHWEB, May 6, 2011, 5 pp.

"Cloud-Based Device Manager streamlines deployment, maintenance; Open Peak Debuts OpenServices Cloud-Based Device Management," Gale Group, Inc. and Thomas Industrial Network, Inc., Jan. 12, 2011, 2 pp.

Reinholz, "Is Mobile Application Management the New Mobile Device Management?," Windows IT Pro magazine, Sep. 1, 2011, 2 pp.

Courtney, "Mobile Apps Need Proper Manage," Incisive Media, Jul. 8, 2010, 2 pp.

"Open Peak Inc.; OpenPeak Introduces Multi-Tiered, OS Agnostic, OpenPeak ADAM(TM) Advanced Device and Application Manager," Information Technology Business via VerticaiNews.com., Aug. 2, 2011, 2 pp.

Reinholz, "Push Android Apps to Smartphones and Tablets," Windows IT Pro magazine, Apr. 1, 2011, 2 pp.

Virtela Launches Industry's First Global Cloud Service for Managing and Securing Mobile Devices; Extends Virtela's Enterprise Services Cloud (ESC) to Provide Platform-Independent Mobile Device Management (MOM); Offers Real-Time Notification Guarantee, PR Newswire, Apr. 21, 2011, 3 pp.

Vaknin, "How to stay synced with iCioud," howto.cnet.com, Jun. 14, 2011, 3 pp.

* cited by examiner

DISTRIBUTING CONTENT TO A HAND-HELD DEVICE AFTER SELECTION AND AUTHORIZATION AT A COMPUTER

CROSS-REFERENCE TO RELATED APPLICATIONS

This application is a continuation of U.S. patent application Ser. No. 13/475,195, filed May 18, 2012, which claims the benefit of U.S. Provisional Application No. 61/488,517, filed May 20, 2011, both of which are hereby incorporated by reference in their entirety.

TECHNICAL FIELD

The present disclosure relates to distribution of applications and other content from servers to handheld devices such as mobile telephones.

BACKGROUND

Handheld computing devices such as the mobile telephone have proliferated in recent years. These devices can be equipped with processors, memory, and the capability to communicate through local and wide area networks, including the Internet. These devices can be equipped with operating systems which permit the devices to execute a wide range of computer programs, typically called "apps." The user of a handheld device can download computer programs and other content by direct communication with a server through a mobile telephone network or wireless local area network. Alternatively, a user can attempt to download content to a personal computer such as a desktop or a laptop computer. Often, it is more convenient for a user to browse, select and purchase an application through a system such as the personal computer. Once the application is downloaded to the personal computer, it may be further transmitted to the handheld device through a process such as synchronization, which can involve tethering the device to the personal computer.

SUMMARY

Methods and apparatuses for distributing content are disclosed. In one implementation, a method is disclosed for distributing content to a handheld device. The method includes receiving, at a first server, a first request that originates at a computer other than the handheld device wherein the first request specifies a content item to be distributed to the handheld device and information identifying the handheld device. The method further includes retrieving, at the first server, configuration information pertaining to the handheld device based on the information identifying the handheld device, transmitting, from the first server to a second server, a second request specifying the content item to be distributed to the handheld device and the information identifying the handheld device and at least a portion of the configuration information pertaining to the handheld device, determining, at a second server, whether the second request is valid based on the information identifying the handheld device and at least some of the portion of the configuration information pertaining to the handheld device, and sending, from the second server, the content item to the handheld device if the second request is valid and if the handheld device is able to receive the content item.

In another implementation, a method is disclosed for distributing content to a handheld device. The method includes receiving information indicative of a request that originates at a computer other than the handheld device wherein the information indicative of a request specifies a content item to be distributed to the handheld device and information identifying the handheld device. The method further includes accessing configuration information pertaining to the handheld device based on at least a portion of the information identifying the handheld device, determining whether the information indicative of a request is valid based on at least some of the portion of the information identifying the handheld device and at least a portion of the configuration information pertaining to the handheld device, and transmitting the content item to the handheld device if the information indicative of a request is valid and if the handheld device is able to receive the content item.

In another implementation, an apparatus is disclosed for distributing content to a handheld device. The apparatus includes a server including one or more processors for controlling the operations of the server, and a memory for storing data and program instructions used by the one or more processors. The one or more processors are configured to execute instructions stored in the memory to receive information indicative of a request that originates at a computer other than the handheld device wherein the information indicative of a request specifies a content item to be distributed to the handheld device and information identifying the handheld device and access configuration information pertaining to the handheld device based on at least a portion of the information identifying the handheld device. The one or more processors are further configured to determine whether the information indicative of a request is valid based on at least some of the portion of the information identifying the handheld device and at least a portion of the configuration information pertaining to the handheld device and transmit the content item to the handheld device if the information indicative of a request is valid and if the handheld device is able to receive the content item.

BRIEF DESCRIPTION OF THE DRAWINGS

The description herein makes reference to the accompanying drawings wherein like reference numerals refer to like parts throughout the several views, and wherein.

DETAILED DESCRIPTION

In the content distribution system and methods described here, a user can distribute content to a handheld device. Content can include application programs such as games, music, e-books, images, video clips, movies, emails, or any other software or data that the user may want to download to a handheld device. The user can specify the content to be distributed to the handheld device using a computer other than the handheld device.

Figure 1:
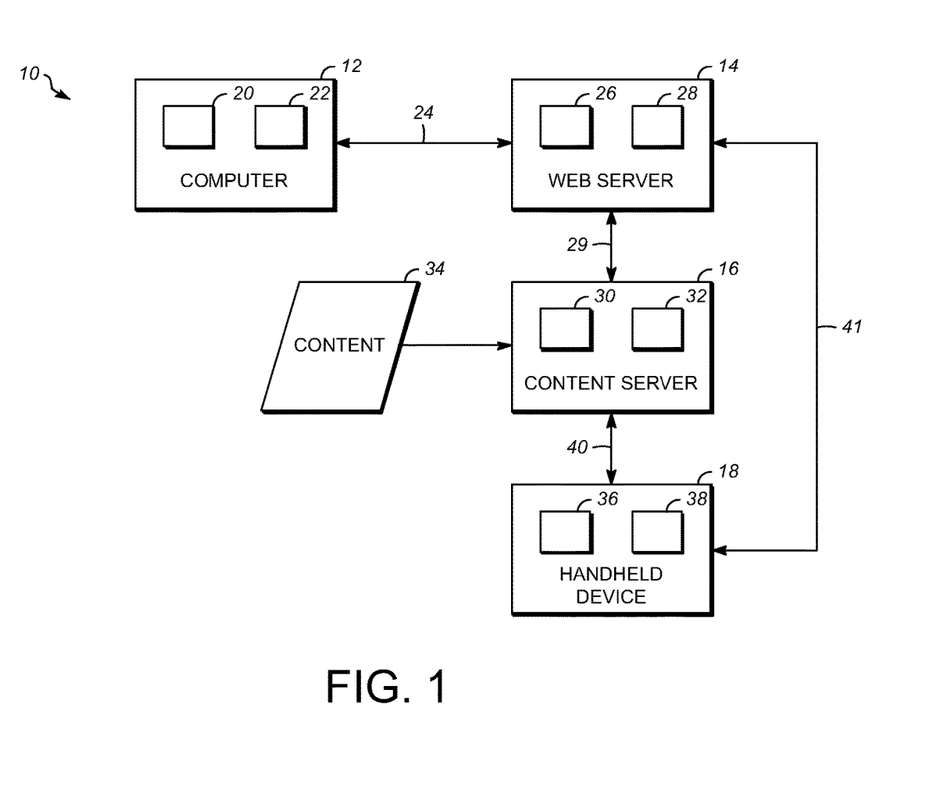
FIG. 1 is a block diagram of a system for distributing content.

FIG. 1 is a block diagram of a system 10 in accordance with one implementation. System 10 can include a computer 12, a web server 14, a content server 16, and a handheld device 18. In the particular example shown in FIG. 1, computer 12 is a personal desktop computer having a processor 20 (e.g., a CPU) and a memory 22 (e.g., flash memory or random access memory). Computer 12 can also be a laptop, notepad, personal digital assistant, tablet computer, cloud computer, smart phone, plug computer, home video game console or any other device.

In some examples, computer 12 is coupled via a conventional broadband connection 24 to web server 14. Web server 14 includes one or more processors 26 and a memory 28. Web server 14 is in communication via a network 29 with content server 16 (such as an "app store"). Content server 16 also includes one or more processors 30 and a memory 32. Content server 16 stores or otherwise has access to content 34 as described above.

In some examples, content server 16 is in wireless communication 40 with handheld device 18. The handheld device can include a processor 36, a memory 38, and an operating system. The wireless communication 40 may use a wireless protocol such as Bluetooth, Wi-Fi, infrared networks, 802.11b, g, or n networks, 3G or 4G, or the like. Handheld device 18 can also communicate with web server 14 via a wireless channel 41. The wireless channel 41 can include wired access point in communication with handheld device 18 via a wireless local area network such as one based the IEEE 802.11 standards or any other suitable wireless standards such as 3G or 4G. Wireless communication 40 and wireless channel 41 operate to couple the handheld device 18 to the content server 16 and web server 14 without a physical connection between the handheld device 18 and the servers 14, 16.

In some examples, handheld device 18 is a smart phone in wireless communication 40 with content server 16 capable of sending a request for distribution of content 34. In other examples, software or hardware constraints of handheld device 18 may not permit access to content 34 by the handheld device 18, or accessing content 34 may be cumbersome for the user of the handheld device 18. For example, a user may find it tedious to enter payment information via handheld device 18, or a user may not have access to handheld device 18 at the moment when he or she wants to acquire content 34 for the handheld device 18, or handheld device 18 has a limited battery life or limited connectivity. The limitations described above, and any other similar limitations, can be overcome by use of system 10 as shown in FIG. 1. For example, a user can browse, select, and/or purchase desired content 34 for distribution to handheld device 18 from computer 12 using system 10.

In some examples, handheld device 18 can also perform a check-in procedure with web server 14 to transmit device information which can include information identifying handheld device 18 and configuration information pertaining to the handheld device 18. The check-in procedure can occur daily, monthly, yearly or any other period of time, or irregularly, such as on-demand, on start-up, on wake-up, or on detection of a network connection. For example, the information identifying the handheld device can be an IP address or telephone number assigned to the device. In some examples, the configuration information can include the hardware description, operating system, or carrier information of handheld device 18. In other examples, the configuration information can include at least one of information concerning the presence, absence and/or configuration of the following features: a touchscreen, hardware acceleration, telephony, WIFI capability, 3G compatibility, storage, memory, battery or processor on handheld device 18. Personally identifiable information of the user of handheld device 18 need not be provided in the device information. The device information can be used during an authentication and validation procedure in web server 14 and/or content server 16 that will be discussed in more detail below.

Figure 2:
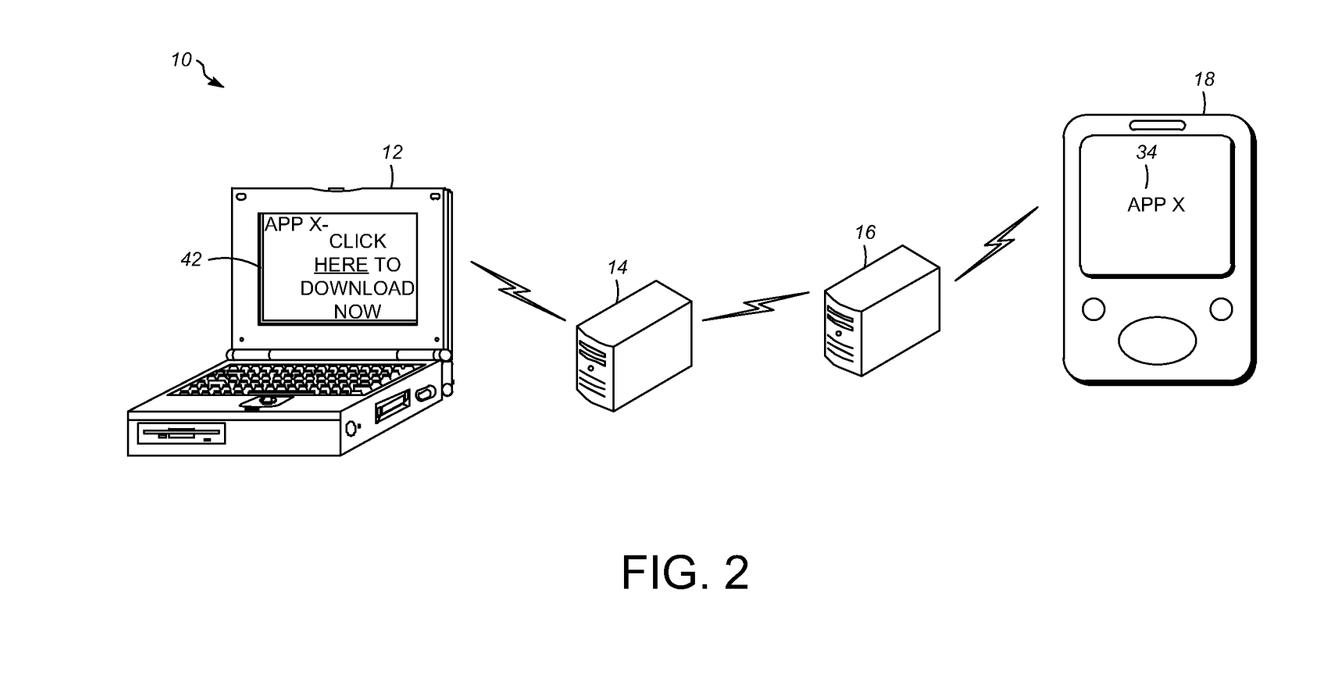
FIG. 2 is a schematic illustration of the use of the system depicted in FIG. 1.

FIG. 2 is a schematic illustration of the use of system 10. In one example, a user can review content 34 at computer 12 by accessing a webpage 42 hosted at web server 14. The user can initiate a distribution, or download, of content 34 to handheld device 18 by clicking an icon, a button, or another element on webpage 42. This results in transmission of a first request from computer 12 to web server 14 specifying content 34 to be distributed to handheld device 18. The first request can specify the content 34 to be distributed. The first request can also specify information identifying handheld device 18 and include configuration information pertaining to handheld device 18. The configuration information pertaining to handheld device 18 can be stored at web server 14, at some other location accessible to web server 14, at content server 16, or another remote location (not shown). For example, the user of computer 12 can enter in the appropriate configuration information via an online form. The configuration information can also be supplied directly or indirectly by handheld device 18 during an initiation process in which the user establishes an account at web server 14.

Web server 14 then transmits a second request to content server 16 to distribute the requested content to handheld device 18. The second request transmitted from web server 14 to content server 16 can include the configuration information pertaining to handheld device 18, information identifying handheld device 18 (such as a telephone number or IP address assigned to handheld device 18), authentication information establishing that the first request is authentic (that is, that the first request originated from a computer 12 authorized to download content onto handheld device 18), and/or information identifying the particular content 34 that has been requested.

Content server 16 can perform authentication and/or validation processing on the second request that it receives from web server 14 to determine if it is appropriate to distribute the requested content 34 to handheld device 18. For example, content server 16 can determine, based on the configuration information pertaining to handheld device 18, whether handheld device 18 is capable of running the requested content 34, that is, whether handheld device 18 is equipped with the hardware and software required to use the requested content 34. Content server 16 can also determine from the information contained in the second request whether the request is authentic, that is, whether the request emanates from a computer 12 and user authorized to request content 34 to operate on handheld device 18. For example, content server 16 can determine whether the telephone number or IP address assigned to the handheld device 18 is authentic. As another example, content server 16 can perform a financial transaction associated with requested content 34 such as charging a payment source previously stored at content server 16 or provided in the second request transmitted to content server 16 by web server 14.

Alternatively the authentication, validation, and payment processing can be performed in whole or in part at web server 14. For example, access to web server 14 can be via a password-protected account which is previously associated with handheld device 18. The user of computer 12 is authenticated by entry of the correct password. Web server 14 and content server 16 can establish a secure session in which web server 14 can authenticate itself to content server 16 using digital certificates. To the extent that web server 14 is trusted by content server 16, content server 16 can rely on indications from web server 14 that a request for content 34 has been authenticated. Web server 14 can also make a determination as to whether the configuration of handheld device 18 will accommodate the requested content 34. Likewise, web server 14 can initiate a financial transaction associated with the requested content 34.

In another example, the second request from web server 14 to content server 16 can be transmitted in a format that mimics a request transmitted directly from handheld device 18. Such an approach can minimize the amount of programming required at content server 16 to implement system 10. Thus, the second request from web server 14 includes such authentication and configuration information as would be included in any request received directly from handheld device 18 for content. The second request can be processed by content server 16 in the same fashion as a request from handheld device 18, thus minimizing the need for specialized programming at content server 16 to operate within system 10.

Because the request for content 34 originates from a user of computer 12, it is possible that handheld device 18 will not be activated and available to receive the requested content 34 when content server 16 fulfills this request. Accordingly, the requested content 34 can be held at content server 16 and transmitted to handheld device 18 at a future time when handheld device 18 is activated and available. For example, handheld device 18 can be programmed to periodically check-in with a central server (not shown) when it is activated. In this case, the central server can notify handheld device 18 that requested content 34 is queued for delivery to the handheld device 18. Requested content can then be downloaded to handheld device 18 from content server 16.

Figure 3:
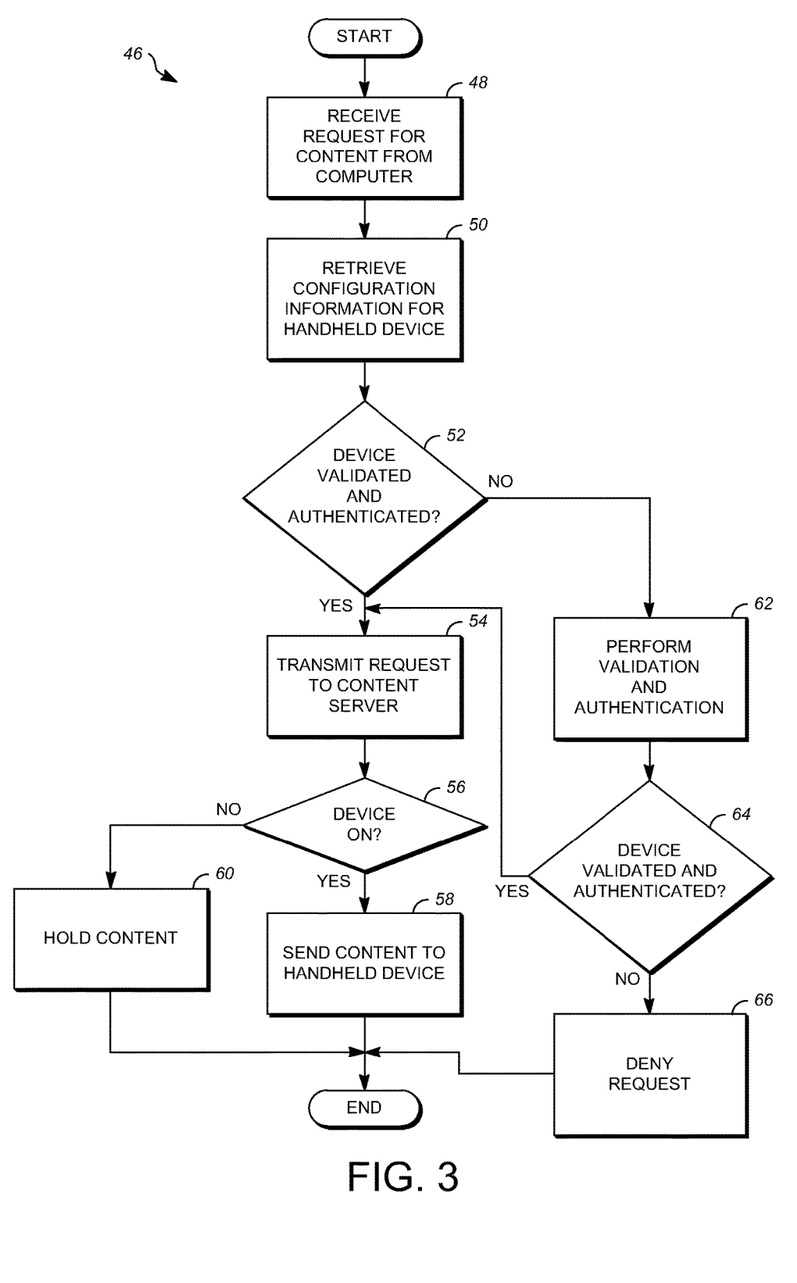
FIG. 3 is a logic flowchart of a process performed by one or more servers in the system of FIG. 1.
Figure 4:
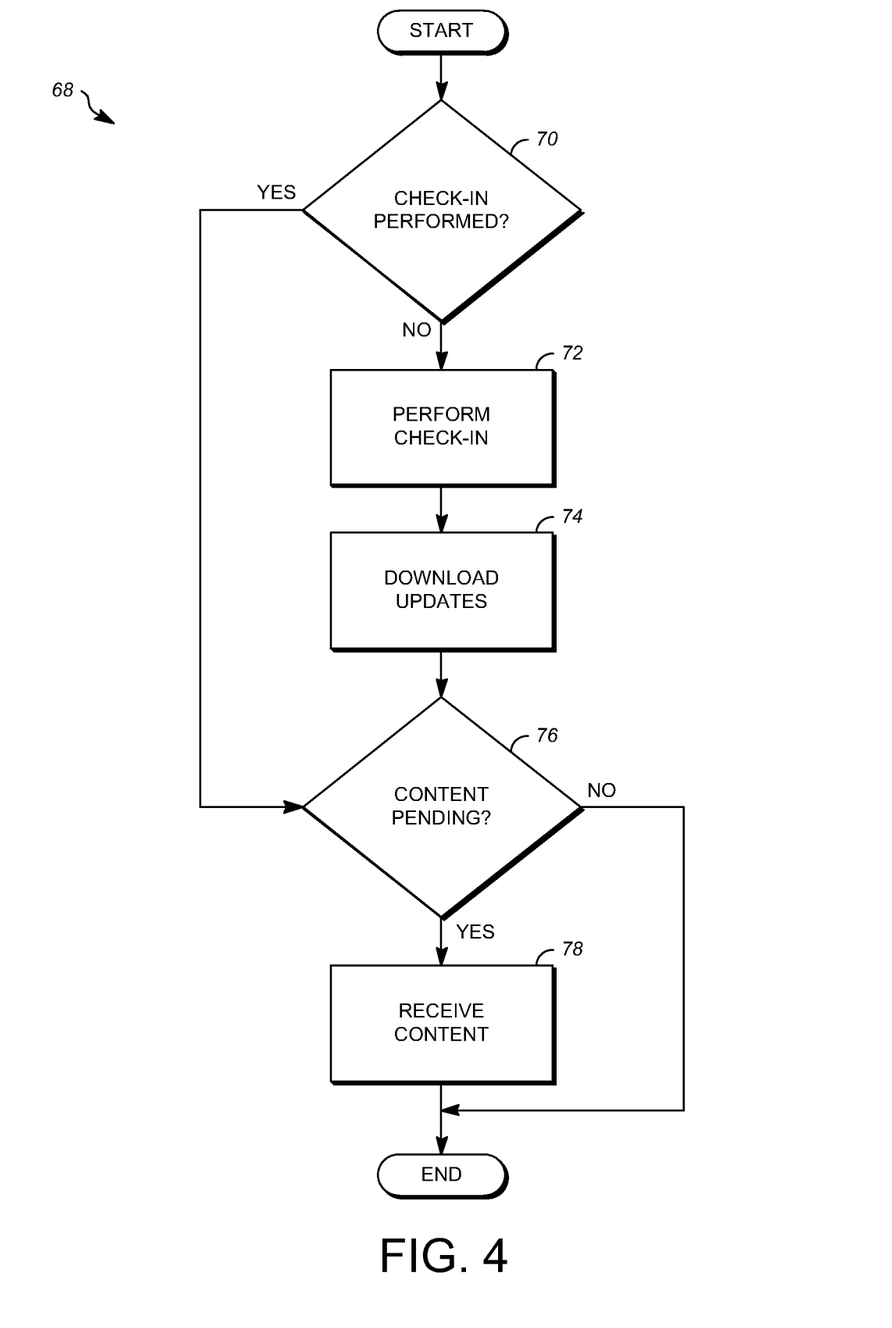
FIG. 4 is a logic flowchart of a process performed by a handheld device in the system of FIG. 1.

Referring to FIGS. 3 and 4, logic flowcharts are provided illustrating the process flows described above in more detail. FIG. 3 is a logic flowchart of a process 46 performed by one or more servers, e.g. web server 14 and content server 16, in system 10. Beginning at step 48, web server 14 receives a first request for content 34 from computer 12. At step 50, web server 14 retrieves configuration information pertaining to handheld device 18. Once the web server 14 retrieves the configuration information, a determination is made as to whether the request is valid and authentic at decision block 52. As discussed previously, the request can be considered valid and authentic if, for example, the information identifying the handheld device 18, such as telephone number or IP address assigned to the handheld device 18, is authentic, that the user or computer 12 is authorized to distribute the content 34 to handheld device 18 and/or that the configuration information pertaining to handheld device 18 indicates that handheld device 18 is capable of running the requested content. Determinations that the first request is valid and/or authentic can also be made by content server 16 in addition to or in lieu of determinations made at web server 14.

If the determination is made that the first request is valid and/or authentic, the web server 14 can transmit a second request for content 34 to content server 16 at step 54. Then, at decision block 56, a determination is made as to whether handheld device 18 is on and is able to receive content 34. In some instances, handheld device 18 will be powered on but will not be in wireless communication 40 with the content server 16. If the handheld device 18 is on and able to receive content, content server 16 can send, e.g. transmit, the requested content 34 to handheld device 18 at step 58. Otherwise, if the handheld device 18 is not on or not able to receive content 34, content server 16 can hold the content 34 for later transmission at step 60. Holding the content 34 can include storing the content 34 on content server 16 or storing the content 34 at another separate server that can be accessed by the handheld device 18 when it is on and able to receive content 34. Alternatively, content server 16 can periodically attempt to send the content 34 to handheld device 18 until the content 34 has been successfully sent. Once the content 34 has been sent to the handheld device 18 in step 58 or held in step 60, the process ends. Alternatively, if the content server 16 is not operating, the request for content 34 can be denied, as will be discussed in more detail below.

Returning to decision block 52, if the request is determined not to be valid or not be authentic, web server 14 can perform supplemental validation and authentication at step 62. Validation and authentication can be performed by matching the configuration information pertaining to the handheld device 18 from the first request sent computer 12 to device information obtained from handheld device 18. For example, if the user of computer 12 enters a telephone number and the type of handheld device 18, web server 14 can verify that that telephone number is in fact associated with that type of handheld device 18. This information can be retrieved from handheld device 18 during the check-in process as described above. Alternative or additional validation and authentication mechanisms are also possible.

Once supplemental validation and authentication is performed, a determination is made as to whether the first request is valid and authenticated at decision block 64. If the first request is valid and authentic, the second request for content 34 can be transmitted to content server 16 as discussed above at step 54. Otherwise, if the first request is not valid or not authentic, the first request can be denied at step 66. Denying the first request can include sending a notification to the user of computer 12 indicating that the content 34 cannot be delivered to handheld device 18. After denying the first request at step 66, the process then ends. As discussed above, validation and authentication processing can also take place on content server 16. For simplicity, validation and authentication processing is shown as taking place only at web server 14 in FIG. 3.

FIG. 4 is a logic flowchart of a process 68 performed by handheld device 18. Beginning at step 70, a determination can be made as to whether handheld device 18 has performed a check-in procedure with web server 14. The check-in procedure, as discussed above, can be performed to transmit device information (e.g., hardware, software and/or carrier information) on a daily, weekly, or monthly basis. Alternatively, the check-in procedure can be performed on request by the web server 14 or as desired by handheld device 18.

If check-in has not been performed, handheld device 18 performs the check-in procedure with the web server 14 at step 72. The check-in procedure can include retrieving device information, such as information identifying handheld device 18 and configuration information pertaining to the handheld device 18, from the handheld device 18 pertaining to, for example, the hardware description, software information, and carrier information. Once the check-in procedure has been performed, handheld device 18 can download any available updates from, for example, web server 14 at step 74. These updates can include security updates, updates to application software or any other updates as desired or required for handheld device 18. If there have been updates to handheld device 18, the handheld device 18 can transmit updated device information to web server 14. In one example, the transmittal of the updated device information can be delayed until the next check-in procedure at the request of web server 14 or can be delayed until any other possible time.

Once updates have been downloaded or the check-in procedure has been performed, handheld device 18 can determine if there is any content 34 pending for download at decision block 76. If there is content 34 pending, handheld device 18 can receive the content 34 at step 78. Otherwise, if there is no content 34 pending for download, the process ends.

The web server 14 and content server 16 (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of web server 14 and content server 16 do not necessarily have to be implemented in the same manner.

For example, the operations of web server 14 and content server 16 can be combined into a single server. Conversely, various features that are described in the context of a single implementation can also be implemented in multiple implementations separately or in any suitable sub-combination. For example, the functions of the web server 14 or the content server 16 can be distributed across a number of different devices. Although illustrated for simplicity as unitary machines, it is understood that web server 14 and content server 16 of system 10 are not necessarily implemented using a single processor, or a single physical machine. Moreover, although features may be described above or claimed as acting in certain combinations, one or more features of a combination can in some cases be excised from the combination, and the combination may be directed to a sub-combination or variation of a sub-combination.

In another example, web server 14 and content server 16 can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Further, all or a portion of the embodiments of the disclosure can take the form of a computer program product accessible from, for example, a non-transitory computer-usable or computer-readable medium. A non-transitory computer-usable or computer-readable medium can be any device that can, for example, tangibly contain, store, communicate, or transport the program for use by or in connection with any processor. The non-transitory medium can be, for example, an electronic device, magnetic device, optical device, electromagnetic device, or a semiconductor device. Other suitable mediums are also available.

While this disclosure includes what is presently considered to be the most practical and preferred embodiments, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method for distributing content to a handheld device, comprising:

receiving, at a first server of a computer system that includes the first server and a second server, a first request that originates at a computer other than the handheld device wherein the first request specifies a content item that can be distributed to the handheld device when the computer system determines that the handheld device and the computer other than the handheld device are linked by a user account;

retrieving, at the first server of the computer system, configuration information about the handheld device;

determining, at the first server of the computer system and based on the configuration information, whether the first request is valid;

responsive to determining that the first request is valid, transmitting, from the first server to the second server, a second request for the content item;

determining, at the second server of the computer system, whether the handheld device is available to receive the content item based on at least a portion of the configuration information and whether the handheld device is in communication with the computer system;

responsive to determining that the handheld device is available to receive the content item, transmitting, from the computer system, to the handheld device, the content item; and responsive to determining that the handheld device is not available to receive the content item, storing, at the computer system, the content item for later transmission to the handheld device.

2. The method of claim 1, wherein the second request specifies the content item to be distributed to the handheld device and information identifying the handheld device.

3. The method of claim 2, further comprising:

determining, by the computer system, whether the first request is valid based on the second request.

4. The method of claim 2, wherein the information identifying the handheld device is user account information.

5. The method of claim 1, further comprising:

transmitting, from the second server, a notification to the handheld device that the content item is available to be sent to the handheld device.

6. The method of claim 2, further comprising:

accessing the configuration information associated with the handheld device based on the information identifying the handheld device.

7. The method of claim 1, wherein transmitting the content item to the handheld device includes the second server transmitting the content item to the handheld device using wireless communication.

8. The method of claim 2, wherein the information identifying the handheld device is at least one of a telephone number, an IP address, and other information associated with ownership of the handheld device.

9. The method of claim 6, wherein the configuration information associated with the handheld device is at least one of hardware description, operating system, carrier information, and other information associated with configuration of the handheld device.

10. A system comprising:

a computer system having a first server and a second server, the computer system configured to:

receive at the first server, a first request that originates at a computer other than the handheld device wherein the first request specifies a content item that can be distributed to the handheld device when the computer system determines that the handheld device and the computer other than the handheld device are linked by a user account;

retrieve, at the first server, configuration information about the handheld device;

determine, at the first server and based on the configuration information, whether the first request is valid;

responsive to determining that the first request is valid, transmit, from the first server to the second server, a second request for the content item;

determine, at the second server, whether the handheld device is available to receive the content item based on at least a portion of the configuration information and whether the handheld device is in communication with the computer system;

responsive to determining that the handheld device is available to receive the content item, transmit the content item to the handheld device; and responsive to determining that the handheld device is not available to receive the content item, store the content item for later transmission to the handheld device.

11. The system of claim 10, wherein the second request specifies the content item to be distributed to the handheld device and information identifying the handheld device.

12. The system of claim 11, wherein the information identifying the handheld device is user account information.

13. The system of claim 10, further configured to:
transmit, from the second server, a notification to the handheld device that the content item is available to be sent to the handheld device.

14. The system of claim 11, further configured to:
access the configuration information associated with the handheld device based on the information identifying the handheld device.

15. The system of claim 10, wherein transmitting the content item to the handheld device includes the second server transmitting the content item to the handheld device using wireless communication.

16. The system of claim 11, wherein the information identifying the handheld device is at least one of a telephone number, an IP address, and other information associated with ownership of the handheld device.

17. The system of claim 14, wherein the configuration information associated with the handheld device is at least one of hardware description, operating system, carrier information, and other information associated with configuration of the handheld device.

18. The method of claim 1, further comprising:
receiving, from the handheld device at the computer system, a request for the content item to be distributed to the handheld device.

19. The method of claim 1, further comprising:
charging a payment source, at the computer system, based on the received first request that specifies the content item.

20. The system of claim 10, wherein the computer system is further configured to receive, from the handheld device, a request for the content item to be distributed to the handheld device.

21. The system of claim 10, wherein the computer system is further configured to charge a payment source, at the computer system, based on the received first request that specifies the content item.

* * * * *